United States Patent
Kim et al.

(10) Patent No.: US 9,207,386 B2
(45) Date of Patent: Dec. 8, 2015

(54) BACKLIGHT UNIT AND LIQUID CRYSTAL DISPLAY MODULE INCLUDING THE SAME

(75) Inventors: Sung-Hun Kim, Gumi-si (KR); Hyeok-Joon Yoon, Gyeongsan-si (KR); Byoung-Ku Kim, Gumi-si (KR); Jae-Hyun Park, Busan (KR)

(73) Assignee: LG DISPLAY CO., LTD., Seoul (KR)

( * ) Notice: Subject to any disclaimer, the term of this patent is extended or adjusted under 35 U.S.C. 154(b) by 723 days.

(21) Appl. No.: 12/585,111

(22) Filed: Sep. 3, 2009

(65) Prior Publication Data

US 2010/0165241 A1 Jul. 1, 2010

(30) Foreign Application Priority Data

Dec. 30, 2008 (KR) .......................... 10-2008-136521

(51) Int. Cl.
*G02F 1/1335* (2006.01)
*F21V 8/00* (2006.01)

(52) U.S. Cl.
CPC ............ *G02B 6/0053* (2013.01); *G02B 6/0051* (2013.01)

(58) Field of Classification Search
CPC ............ G02F 1/133606; G02B 6/0051; G02B 6/0053; G02B 6/0055; G02B 6/005; G02B 5/021; G02B 5/0215; G02B 5/0231; G02B 3/005; G02B 3/0062
USPC ................................ 349/61–67; 362/600–632
See application file for complete search history.

(56) References Cited

U.S. PATENT DOCUMENTS

| | | | | |
|---|---|---|---|---|
| 6,426,763 | B1* | 7/2002 | Sagawa ........................... | 346/65 |
| 7,157,125 | B2* | 1/2007 | Kamiya et al. ................. | 428/1.5 |
| 7,199,930 | B2* | 4/2007 | Yao et al. ....................... | 359/619 |
| 8,045,092 | B2* | 10/2011 | Jeong et al. .................... | 349/62 |
| 2002/0131261 | A1* | 9/2002 | Inui et al. ....................... | 362/31 |
| 2004/0061944 | A1* | 4/2004 | Kashima et al. ............... | 359/599 |
| 2006/0050197 | A1* | 3/2006 | Hu et al. ......................... | 349/61 |
| 2006/0209562 | A1* | 9/2006 | Lee et al. ....................... | 362/606 |
| 2008/0225201 | A1* | 9/2008 | Hoshi ............................. | 349/62 |

FOREIGN PATENT DOCUMENTS

| | | |
|---|---|---|
| CN | 1162757 | 10/1997 |
| CN | 101308282 | 11/2008 |
| KR | 1020060074548 A | 7/2006 |
| KR | 10-2007-0033917 A | 3/2007 |
| KR | 10-2008-0090700 A | 10/2008 |
| KR | 10-2008-0094495 A | 10/2008 |
| TW | M295745 | 8/2006 |
| TW | 200846774 | 12/2008 |

* cited by examiner

*Primary Examiner* — Edward Glick
*Assistant Examiner* — David Chung
(74) *Attorney, Agent, or Firm* — Dentons US LLP

(57) ABSTRACT

A backlight unit for a display device includes a light guide plate; a reflective sheet under the light guide plate; a lamp at least one side of the light guide plate and providing a light into the light guide plate; and an optical sheet disposed on the light guide plate and including a first lenticular sheet, the first lenticular sheet including a base film for diffusing the light through the light guide plate, a first lenticular lens disposed on a front surface of the base film and having a half-cylinder shape and a first printing pattern on at least one edge of a rear surface of the base film.

22 Claims, 10 Drawing Sheets

BACKLIGHT UNIT AND LIQUID CRYSTAL DISPLAY MODULE INCLUDING THE SAME

The present invention claims the benefit of Korean Patent Application No. 10-2008-0136521 filed in Korea on Dec. 30, 2008, which is hereby incorporated by reference for all purposes as if fully incorporated herein.

BACKGROUND OF THE INVENTION

1. Field of the Invention

The invention relates to a backlight unit and a liquid crystal display module (LCDM), and more particularly, to a backlight unit having less optical sheet and advantages of light weight and a thin profile and providing light of uniform brightness and an LCDM including the backlight unit.

2. Discussion of the Related Art

The liquid crystal display (LCD) devices are widely used for notebook computers, monitors, TV, and so on, because of their high contrast ratio and characteristics adequate to display moving images. The LCD devices use optical anisotropy and polarization properties of liquid crystal molecules to display images.

The LCD devices require a liquid crystal panel including first and second substrates and a liquid crystal layer interposed therebetween. An arrangement of the liquid crystal molecules in the liquid crystal layer is changed by an electric field induced in the liquid crystal panel to control light transmissivity.

Generally, an additional light source is required because the LCD panel is a non-emissive-type display device. Accordingly, a backlight unit is disposed under the LCD panel. The LCD device displays images using light produced by the backlight unit and supplied to the LCD panel. A cold cathode fluorescent lamp (CCFL), an external electrode fluorescent lamp and a light emitting diode (LED) are used as a light source of the backlight unit. Among these light sources, the LEDs are widely used because of advantages in a size, power consumption and reliability.

FIG. 1 a cross-sectional view of the related art direct type liquid crystal display module (LCDM) using an LED as a light source. Referring to FIG. 1, the LCDM includes a liquid crystal panel 10, a backlight unit 20, a main frame 30, a bottom frame 50 and a top frame 40. The liquid crystal panel 10 includes first and second substrates 12 and 14 facing each other and a liquid crystal layer (not shown) therebetween. First and second polarizing plates 19a and 19b for controlling a polarization direction of light, are respectively disposed at front and rear sides of the liquid crystal panel 10.

The backlight unit 20 is disposed at a rear side of the liquid crystal panel 10. The backlight unit 20 includes an LED assembly 29 arranged along a length direction of at least one edges of the main frame 30, a reflective sheet 25 of white or silver color on the bottom frame 50, a light guide plate 23 on the reflective sheet 25 and an optical sheet 21 on the light guide plate 23. The LED assembly 29 is positioned at one side of the light guide plate 23 and includes at least one LED 29a emitting white light and an LED printed circuit board (PCB) 29b where the LED 29a is disposed. The optical sheet 21 includes a plurality of sheets.

The liquid crystal display panel 10 and the backlight unit 20 are combined using the main frame 30 that can prevent movement of the liquid crystal panel 10 and the backlight unit 20. The top frame 40 cover edges of the liquid crystal panel 10 and sides of the main frame 30, so the top frame 40 can support and protect of the edges of the liquid crystal panel 10 and sides of the main frame 30. The bottom frame 50 covers back edges of the main frame 30, so the bottom frame 50 is combined with the main frame 30 and the top frame 40 for modulation.

FIG. 2 is an enlarged cross-sectional view of an "A" portion in FIG. 1, and FIG. 3 is a cross-sectional view of an optical sheet in the related art LCDM.

Referring to FIGS. 2 and 3 with FIG. 1, the LED 29a is positioned at one side of the light guide plate 23 and arranged on the PCB 29b. The LED 29a has a fixed position and faces a side portion of the light guide plate 23 such that light emitted from the LED 29a is projected to the light guide plate 23. To provide a space for the LED assembly 29, the bottom frame 50 has a bending portion 51. Namely, the bottom frame 50 is bent upwardly and inwardly. The LED assembly 29 is fixed in the bending portion 51 using an element, for example, a double coated tape. The above backlight unit may be called as a side-view type.

The light F emitted from the LED 29a is projected to the light guide plate 23 and refracted or reflected to be projected onto the liquid crystal panel 10. The light F is processed into an uniform plane light source during passing the optical sheet 21. The optical sheet 21 includes four sheet of a first diffusion sheet 21a for diffusing light from the optical sheet 23, first and second prism sheets 21b and 21c for controlling a direction of light and a second diffusion sheet 21d.

There is a gap G between the bending portion 51 of the bottom frame 50 and the light guide plate 23. A part of the light F from the LED 29a is directly projected onto the liquid crystal panel 10 without passing through the optical sheet 21 such that a light leakage problem is generated. The light leakage problem causes a hot spot problem on the displayed image. The hot spot portion is very much brighter than other portions. To prevent this hot spot problem, a printed pattern PA is formed at a rear side of each of the first and second diffusion sheets 21a and 21d.

On the other hand, the LCD module is required to be thinner and lighter. In addition, a decrease of production costs is required. To meets these requirements, a decrease in a number of sheets of the optical sheet is very important point. Unfortunately, when the first and second diffusion sheets 21a and 21d are omitted, there is still the hot spot problem because the printed pattern PA is also omitted with the first and second diffusion sheets 21a and 21d. A process of forming the printed pattern on the first and second prism sheets 21b and 21c causes another problem. For example, there are damages on a prism pattern on the prism sheet during the printed pattern forming process. Alternately, when the first and second prism sheets 21b and 21c are omitted, there is a problem in light path such that brightness of the displayed image is reduced.

SUMMARY OF THE INVENTION

Accordingly, embodiments of the invention are directed to a backlight unit and an LCDM including the same that substantially obviate one or more of the problems due to limitations and disadvantages of the related art.

An object of the invention is to provide a backlight unit including less optical sheets and preventing a hot spot problem.

Another object of the invention is to reduce production costs in a backlight unit and an LCDM.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a backlight unit for a display device includes a light guide plate; a reflective sheet under the light guide plate; a lamp at least one side of the light guide plate and providing a light into the light guide plate; and an optical sheet disposed on the light guide plate and including a first lenticular sheet, the first lenticular sheet including a base film for diffusing the light through the light guide plate, a first lenticular lens disposed on a front surface of the base film and having a half-cylinder shape and a first printing pattern on at least one edge of a rear surface of the base film.

In another aspect, a liquid crystal display module includes a liquid crystal panel; a backlight unit for projecting light on the liquid crystal panel, the backlight unit including a light guide plate; a reflective sheet under the light guide plate; a lamp at least one side of the light guide plate and providing a light into the light guide plate; and an optical sheet disposed on the light guide plate and including a first lenticular sheet, the first lenticular sheet including a base film for diffusing the light through the light guide plate, a first lenticular lens disposed on a front surface of the base film and having a half-cylinder shape and a first printing pattern on at least one edge of a rear surface of the base film; a bottom frame under the backlight unit; a main frame surrounding sides of the backlight unit; and a top frame surrounding an edge of the liquid crystal panel and attached to the bottom frame and the main frame.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF EXEMPLARY EMBODIMENTS

Reference will now be made in detail to exemplary embodiments of the invention, which are illustrated in the accompanying drawings.

Figure 1:
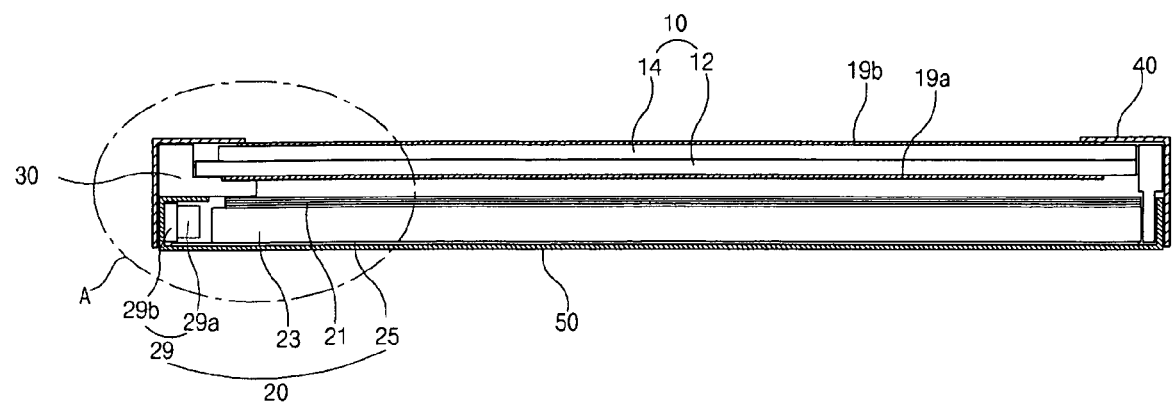
FIG. 1 a cross-sectional view of the related art direct type liquid crystal display module (LCDM) using an LED as a light source.
Figure 2:
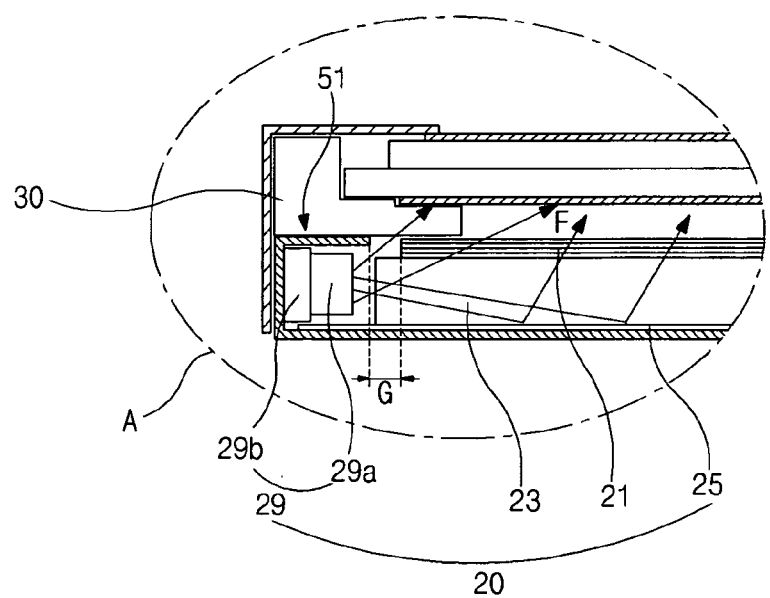
FIG. 2 is an enlarged cross-sectional view of an "A" portion in FIG. 1.
Figure 3:
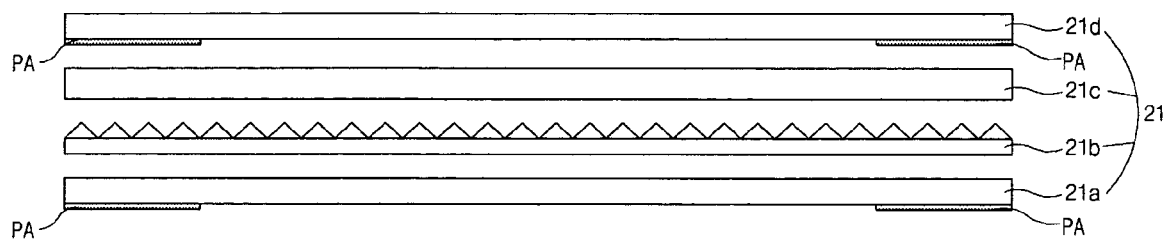
FIG. 3 is a cross-sectional view of an optical sheet in the related art LCDM.
Figure 4:
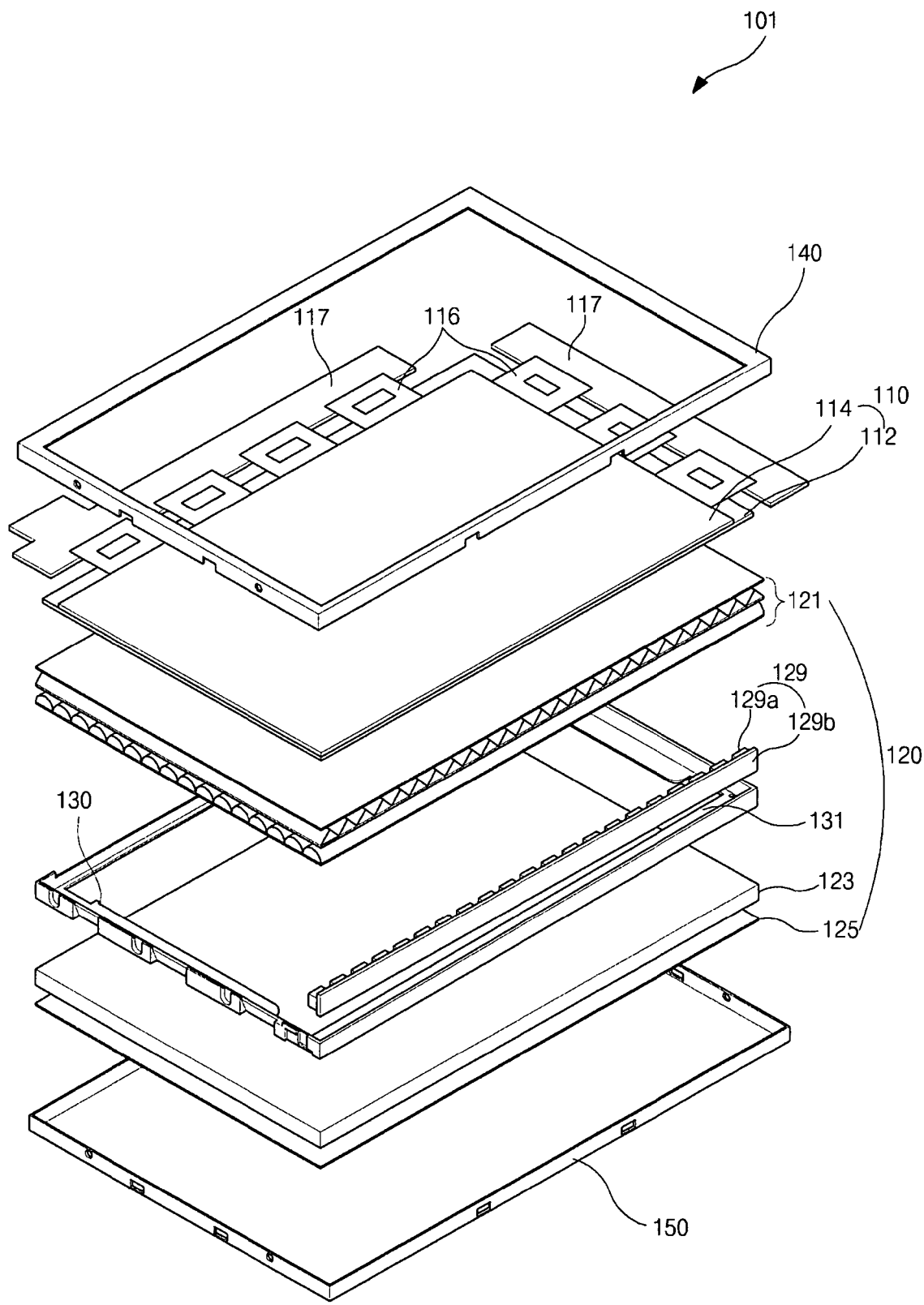
FIG. 4 is an explode perspective view of an LCDM according to the present invention.

FIG. 4 is an explode perspective view of an LCDM according to the present invention. Referring to FIG. 4, an LCDM 101 includes a liquid crystal panel 110, a backlight unit 120, a main frame 130, a bottom frame 150 and a top frame 140.

The liquid crystal panel 110 includes first and second substrates 112 and 114 facing each other and a liquid crystal layer (not shown) therebetween. In an active matrix type, array elements, for example, a gate line (not shown), a data line (not shown), a thin film transistor (not shown) and a pixel electrode, are formed on the first substrate 112. The gate and data lines cross each other to define a pixel region, and the thin film transistor is formed at a crossing portion of the gate and data lines. The pixel electrode is disposed in the pixel region and connected to the thin film transistor. In addition, a black matrix (not shown) corresponding to the gate line, the data line and the thin film transistor to block light and a color filter layer (not shown) having red, green and blue colors are formed on the second substrate 114. A common electrode (not shown) is also formed on the second substrate 114 to generate an electric field with the pixel electrode on the first substrate 112. Moreover, first and second polarizing plates for selectively transmitting light are positioned on outer sides of the first and second substrates 112 and 114.

The liquid crystal panel 110 is connected to a driving printed circuit board (PCB) 117 through a connection member 116 that provide a scanning signal and an image signal to the liquid crystal panel 110, respectively. The driving printed circuit board 117 extends along end portions of a bottom frame 150 of the backlight unit 120, respectively, as dummy spaces. When the thin film transistor has an ON state by the scanning signal from a gate driving circuit, the image signal is applied to the pixel electrode through the data line to produce an electric field between the pixel electrode and the common electrode. As a result, as the intensity or direction of the electric field is changed, the alignment of the liquid crystal molecules in the liquid crystal layer also changes such that light transmissivity is controlled.

To display images using the controlled transmissivity, the backlight unit 120 providing light to the liquid crystal panel 110 is disposed at a rear side of the liquid crystal panel 110. The backlight unit 110 includes an LED assembly 129 as a light source, a reflective sheet 125 of white or silver color on the bottom frame 150, a light guide plate 123 on the reflective sheet 125 and an optical sheet 121 including two or three sheets on the light guide plate 23.

FIG. 4 shows the optical sheet 121 including three sheets. The optical sheet 121 in FIG. 4 includes a first lenticular sheet 121a, a prism sheet 121b and a diffusion sheet 121c sequentially stacked on the light guide plate 123. Alternatively, the optical sheet 121 may includes two sheets of a first lenticular sheet and a prism sheet or a first lenticular sheet and a second lenticular sheet. A dot pattern, which will be explained later, may be formed on a bottom surface of each of the first and second lenticular sheets. In addition, a printing pattern, which will be explained later, may be formed on a bottom edge of each of the first and second lenticular sheets and the diffusion sheet. The optical sheet 121 has a function of concentrating or diffusing light passing through the light guide plate 123 such that a plane light source having an uniform brightness is provided onto the liquid crystal panel 110.

The LED assembly 129 as a light source is positioned at least one side of the light guide plate 123. The LED assembly 129 includes a printed circuit board (PCB) 129b and at least one LED 129a thereon. Other lamp, for example, a fluorescent lamp (not shown), may be used for the light source.

The light from the LED 129a is totally reflected in and spreads out through the light guide plate 123 such that a plane light source can be provided onto the liquid crystal panel 110. To provide much uniform plane light source, a pattern may be formed on a rear surface of the light guide plate 123. The reflective sheet 125 is disposed under the light guide plate 123 to reflect the light onto the liquid crystal panel 110 such that a brightness of a displayed image on the liquid crystal panel 110 is improved.

The liquid crystal display panel 110 and the backlight unit 120 are combined using the main frame 130 that can prevent movement of the liquid crystal panel 110 and the backlight unit 120. The top frame 140 cover edges of the liquid crystal panel 110 and sides of the main frame 130 and the light crystal panel 110, so the top frame 140 can support and protect of the edges of the liquid crystal panel 110 and sides of the main frame 130 and the light crystal panel 110. The bottom frame 150 covers back edges of the main frame 130, so the bottom frame 150 is combined with the main frame 130 and the top frame 140 for modulation.

FIGS. 5A to 5D are respectively perspective views of an optical sheet for a backlight unit of an LCDM according to the present invention.

The light from the light guide plate 123 (of FIG. 4) is diffused or concentrated by the optical sheet 121 of the LCDM 101 (of FIG. 4) such that an uniform plane light source is provide onto the liquid crystal panel 110 (of FIG. 4). Namely, the optical sheet 121 has a function of concentrating and diffusing the light.

In the related art LCDM, two prism sheets are used for concentrating the light, and two diffusion sheets are used for diffusing the light. However, in the LCDM according to the present invention, one lenticular sheet 121a instead of one prism sheet and one diffusion sheet is used for diffusing and concentrating the light. The lenticular sheet 121a includes a printing pattern PA, which has one of a circular shape, an elliptic shape and a polygonal shape, on edges of a rear side of the lenticular sheet 121a to prevent a light leakage. In addition, the lenticular sheet 121a includes a dot pattern (not shown) on a center of the rear side of the lenticular sheet 121a or beads (not shown) inside of the lenticular sheet 121a to improve a function of diffusing the light.

Figure 5A:
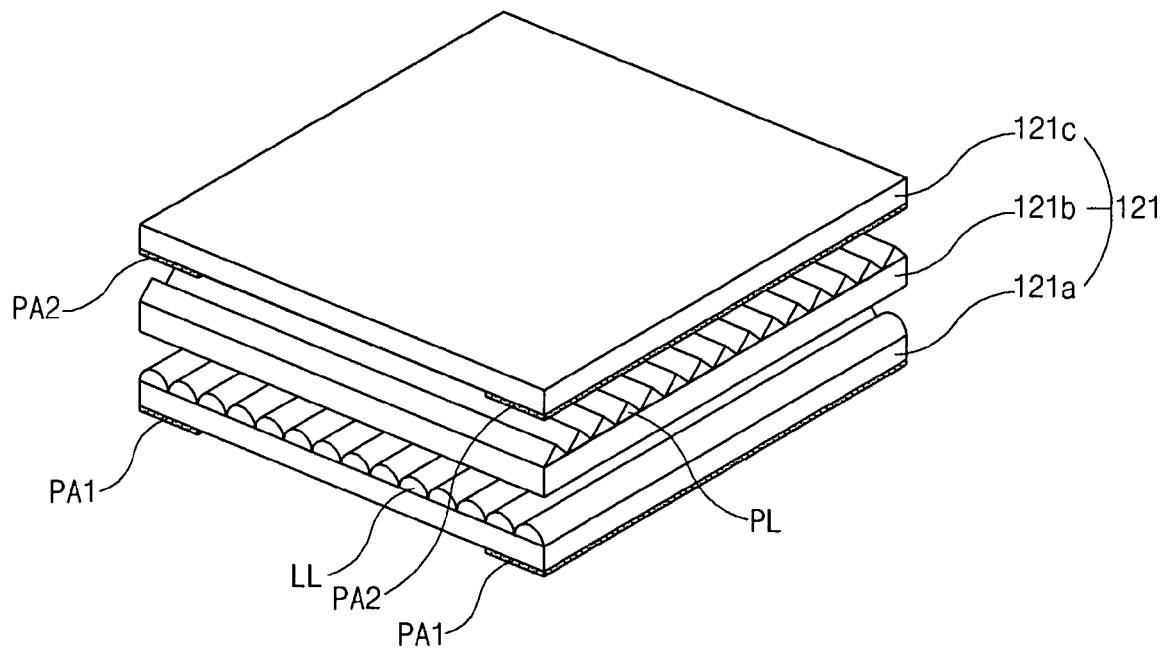
FIGS. 5A to 5D are respectively perspective views of an optical sheet for a backlight unit of an LCDM according to the present invention.
Figure 6A:
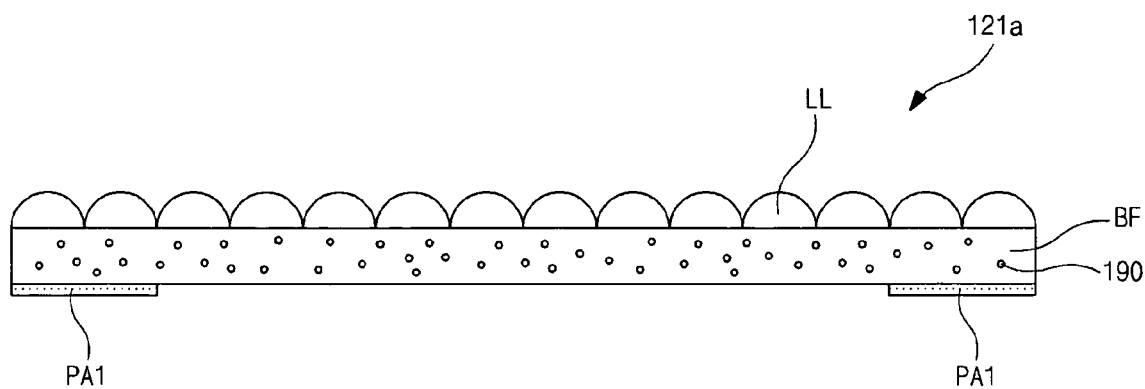
FIGS. 6A and 6B are respectively cross-sectional views of a lenticular sheet for a backlight unit according to the present invention.

In FIG. 5A, the optical sheet 121 includes a first lenticular sheet 121a, a prism sheet 121b on the first lenticular sheet 121a and a diffusion sheet 121c on the prism sheet. Referring to FIG. 6A, which is cross-sectional view of a lenticular sheet for a backlight unit according to the present invention, the first lenticular sheet 121a includes a base film BF, beads 190, a lenticular lens LL and a first printing pattern PA1. The base film BF is formed of a transparent material, for example, an acryl-based resin, polymethylmethacrylate (PMMA), polyethylene terephthalate (PET), and so on. The beads 190 is disposed inside of the base film BF and non-uniformly dispersed such that the base film BF has various haze properties depending on a light uniformity. The lenticular lens LL having a half-cylinder shape along a first direction is formed on a front side of the base film BF, and a first printing pattern PA1 is formed on edges of a rear side of the base film BF. The light is concentrated by the lenticular lens LL and is diffused by the beads 190. The printing pattern PA has one of a circular shape, an elliptic shape and a polygonal shape.

When the light passes through a transparent material, the light is diffused by a specific property of the transparent material by the haze property except the reflection or absorption such that an opaque blur image is observed. The haze property is calculated by following formula.

Haze(%)=((a total amount of transmitted light)−(an amount of straight-ahead light))/(a total amount of transmitted light)*100.

Desired brightness and viewing angle are obtained by controlling the haze property. If the base film has the haze property less than 30%, the viewing angle is narrow. If the base film has the haze property larger than 90%, the light transmissivity decreases such that brightness of a displayed image is reduced.

Figure 6B:
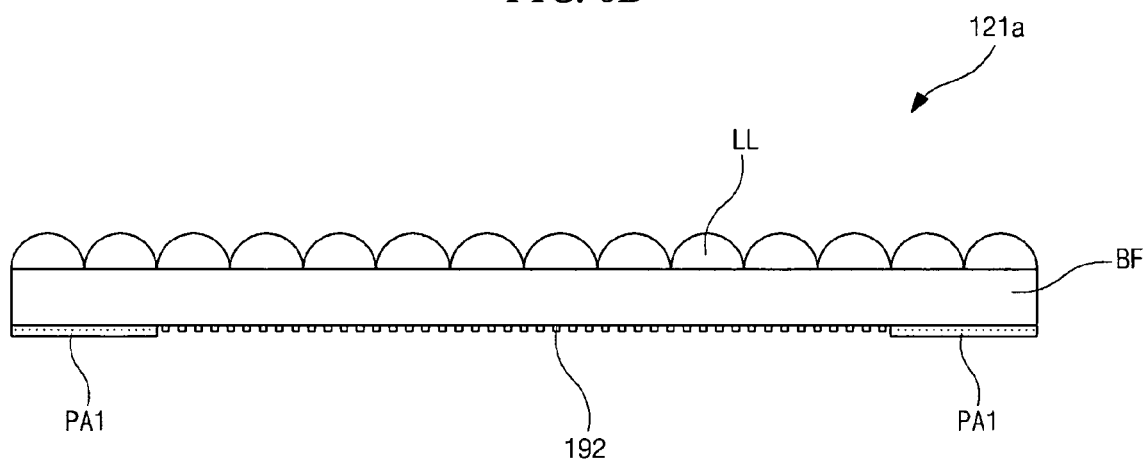

Alternatively, in FIG. 6B, the first lenticular sheet 121a includes the base film BF, dot patterns 192, the lenticular lens LL and the first printing pattern PA1. The base film BF has the same characteristics as the base film BF in FIG. 6A. The dot patterns 192 are formed on a center of the rear side of the base film BF and have the same function as the beads 190 (of FIG. 6A). Namely, a diffusion angle of light is controlled by a shape of the dot patterns 192. For example, the dot pattern 192 may have an elliptical shape or a polygonal shape. The dot pattern 192 may be a hologram pattern such that the light is refracted in an asymmetric direction by an interference pattern, for example, the beads 190 or the dot patterns 192. As a result, a concentrated light is diffused in a much inclined angle such that an uniform plane light source is obtained.

Referring back to FIG. 5A, a prism lens PL along a second direction, which crosses the first direction of the lenticular lens LL of the first lenticular sheet 121a, is disposed on the prism sheet 121b. For example, the second direction is perpendicular to the first direction. The prism lens LL has a triangular shape. A second printing pattern PA2 is formed on edges of a rear side of the diffusion sheet 121c on the prism sheet 121b. A position of the second printing pattern PA2 corresponds to that of the first printing pattern PA1.

Figure 5B:
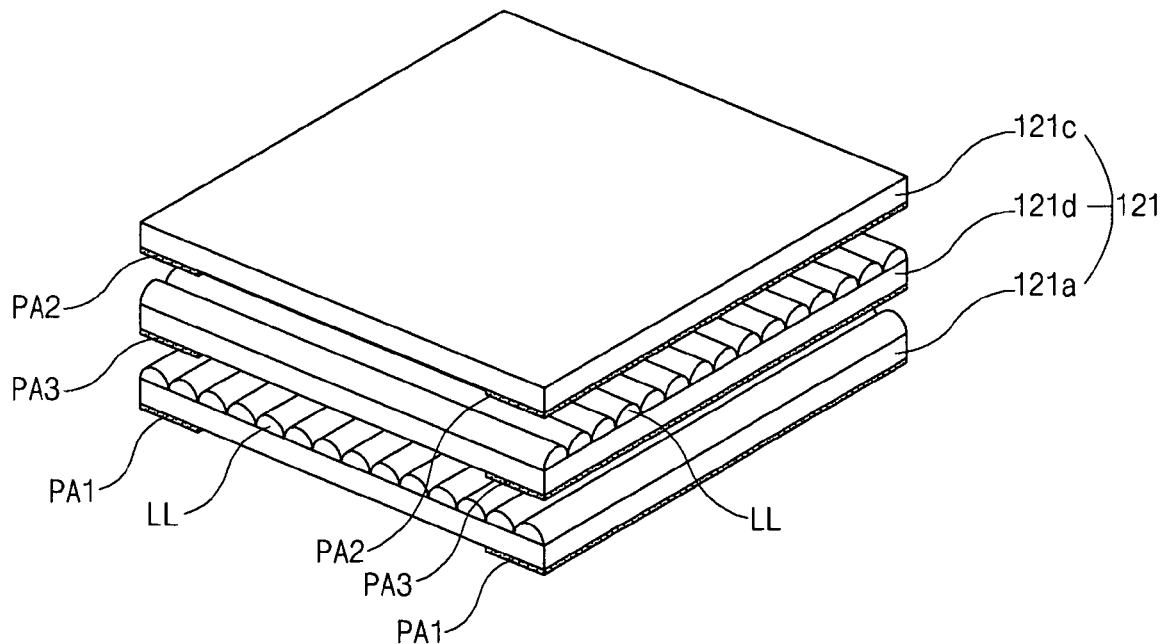

In FIG. 5B, the optical sheet 121 includes a first lenticular sheet 121a, where a lenticular lens LL is formed along a first direction, a second lenticular sheet 121d, where a lenticular lens LL is formed along a second direction crossing the first direction, on the first lenticular sheet 121a, and a diffusion sheet 121c on the second lenticular sheet 121d. For example, each of the lenticular sheets LL on the first and second lenticular sheets 121a and 121d has a half-cylinder shape. A third printing pattern PA3 is formed on edges of a rear side of the second lenticular sheet 121d and corresponds to each of a first printing pattern PA1 on back edges of the first lenticular sheet 121a and a second printing pattern PA2 on back edges of the diffusion sheet 121c.

Figure 5C:
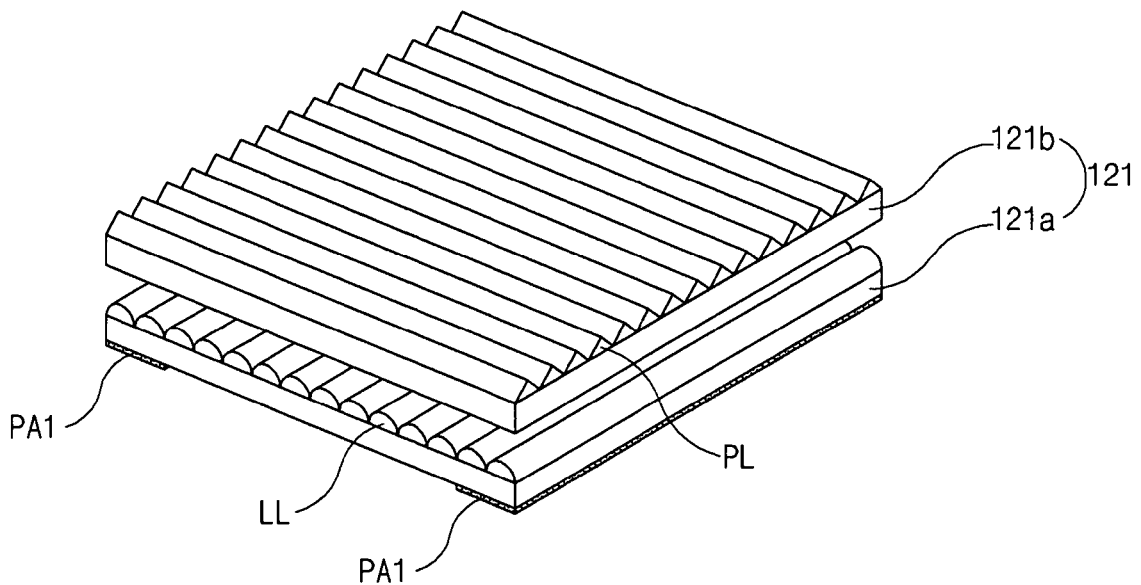

In FIG. 5C, the optical sheet 121 includes two sheets of a first lenticular sheet 121a and a prism sheet 121b. A lenticular lens LL is formed along a first direction on the first lenticular sheet 121a, and a prism lens PL is formed along a second direction on the prism sheet 121b. For example, the first direction is perpendicular to the second direction. A first printing pattern PA1 is formed on back edges of the first lenticular sheet 121a.

Figure 5D:
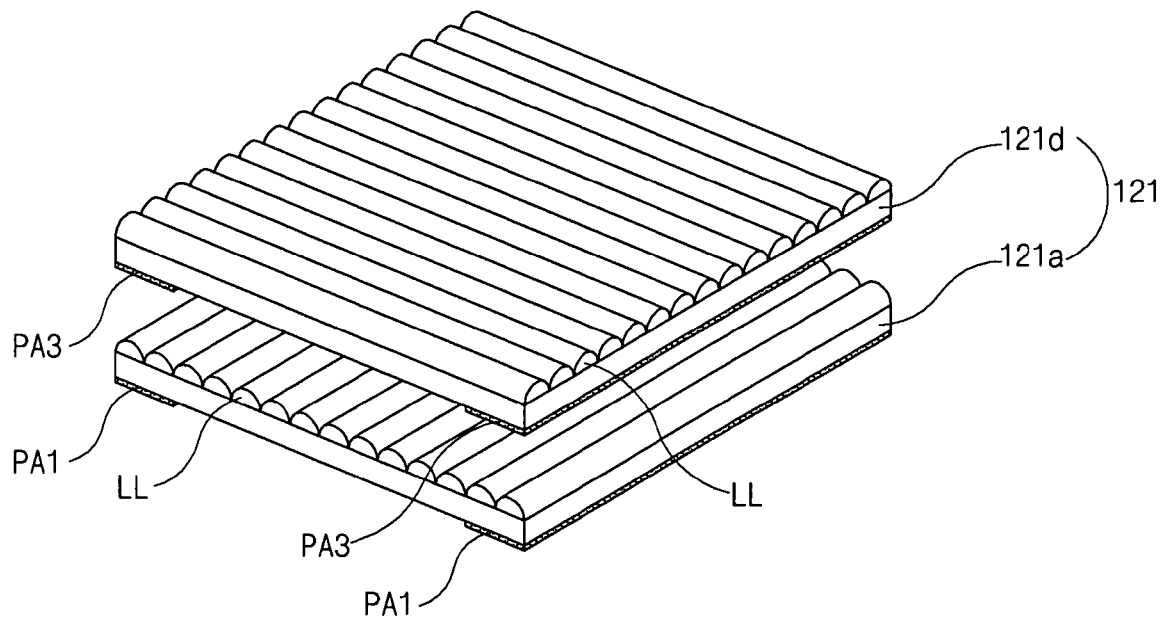

In FIG. 5D, the optical sheet 121 includes two sheets of first and second lenticular sheets 121a and 121d. A lenticular lens LL is formed on both of the first and second lenticular sheets 121a and 121d. The lenticular lens LL on the first lenticular sheet 121a is along a first direction, and the lenticular lens LL on the second lenticular sheet 121d is along a second direction. For example, the first direction is perpendicular to the second direction. A first printing pattern PA1 is formed on back edges of the first lenticular sheet 121a, and a second printing pattern PA2 is formed on back edges of the second lenticular sheet 121d. The first printing pattern PA1 corresponds to the second printing pattern PA2.

FIGS. 5A to 5D show each of the first to third printing patterns PA1, PA2 and PA3 is formed at opposite two sides. However, each of the first to third printing patterns PA1, PA2 and PA3 may be formed at one, three or fourth sides.

The above first lenticular sheet 121a serves as a concentration sheet for light from the light guide plate. At the same time, the first lenticular sheet 121a serves as a diffusion sheet for light from the light guide plate. Namely, the first lenticular sheet 121a has a function of both of one prism sheet and one diffusion sheet in the related art LCDM. As a result, the related art LCDM requires the optical sheet of at least four sheets, while the LCDM according to the present invention requires the optical sheet 121 of three or two sheets.

FIGS. 7A to 7D are respectively plan views illustrating a printed pattern on a lenticular sheet for a backlight unit according to the present invention. FIGS. 7A to 7D respectively show the printing pattern on back edges of the lenticular sheet. However, the printing pattern may be formed on back edges of the diffusion sheet and the second lenticular sheet, as shown in FIG. 5B.

Figure 7A:
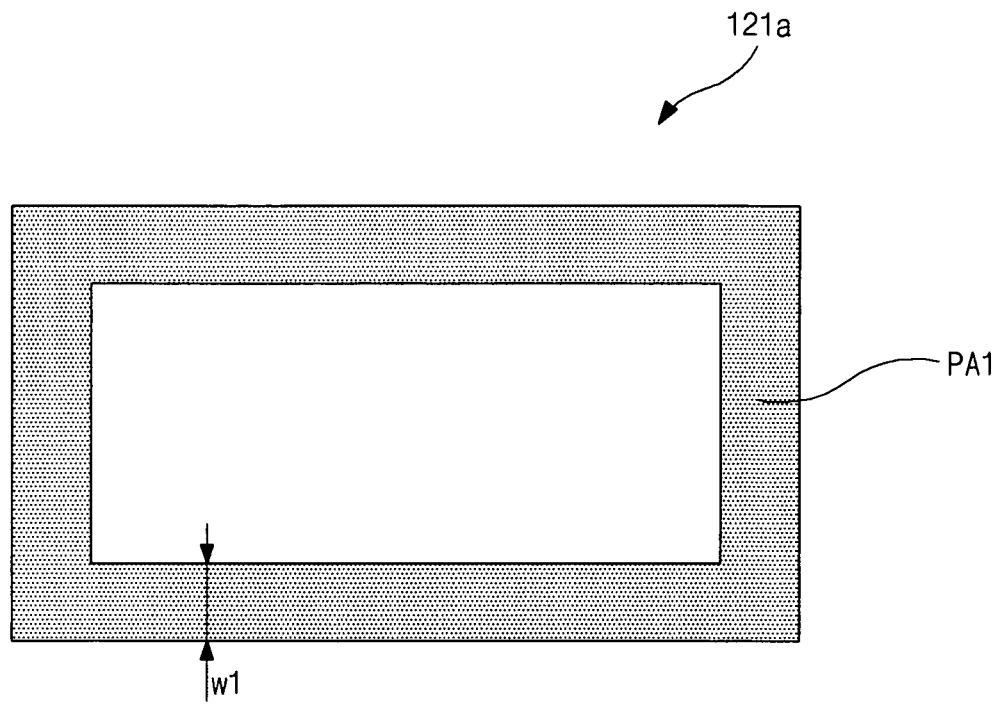
FIGS. 7A to 7D are respectively plan views illustrating a printed pattern on a lenticular sheet for a backlight unit according to the present invention.
Figure 7B:
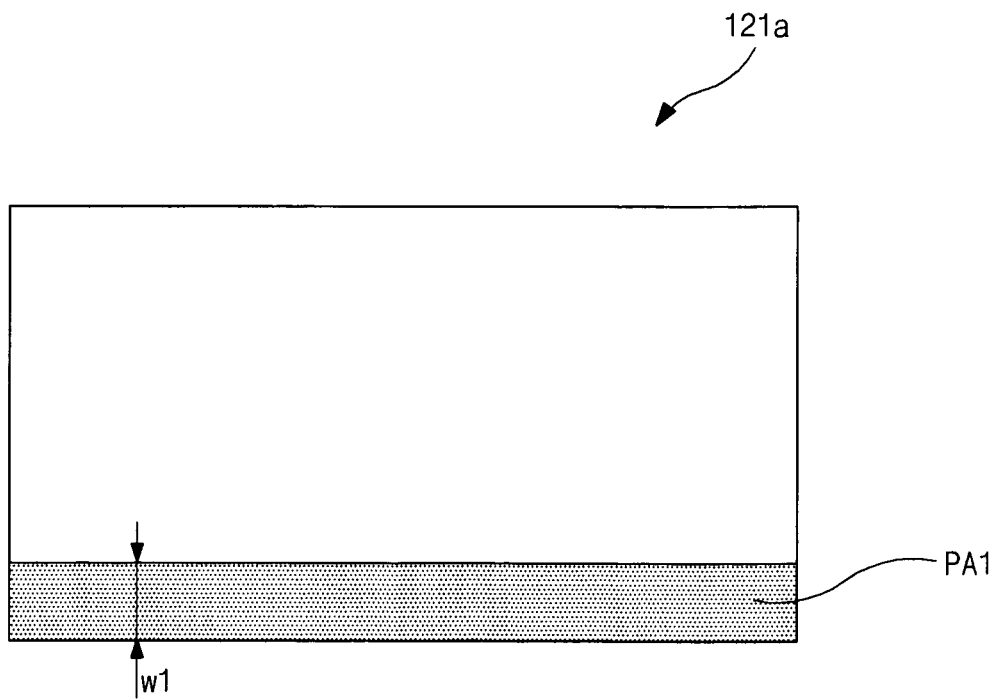
Figure 7C:
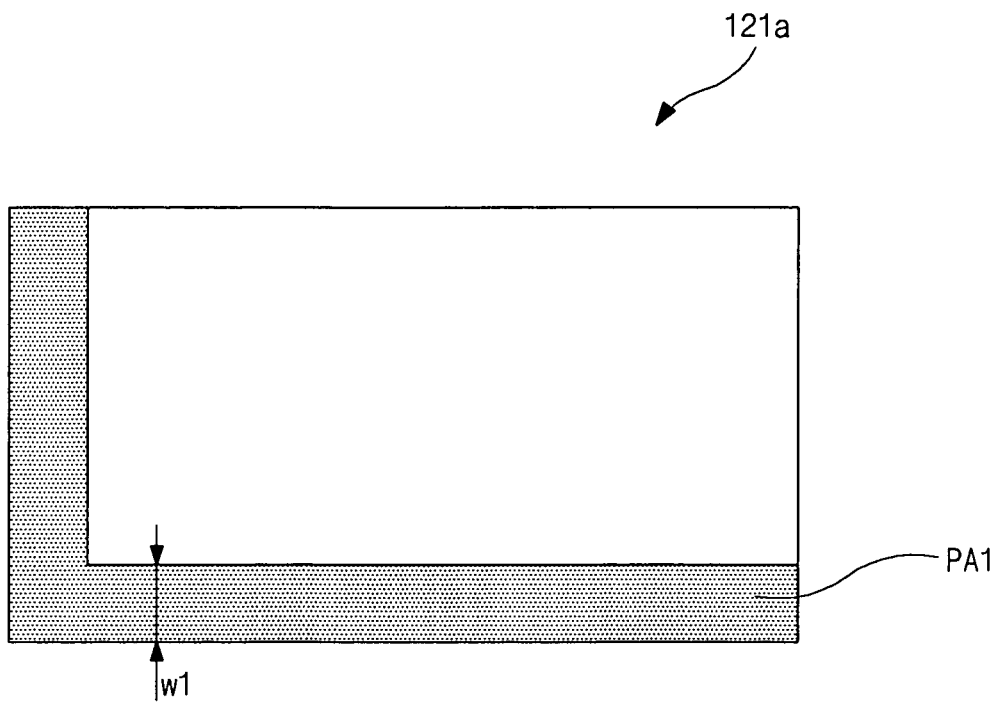
Figure 7D:
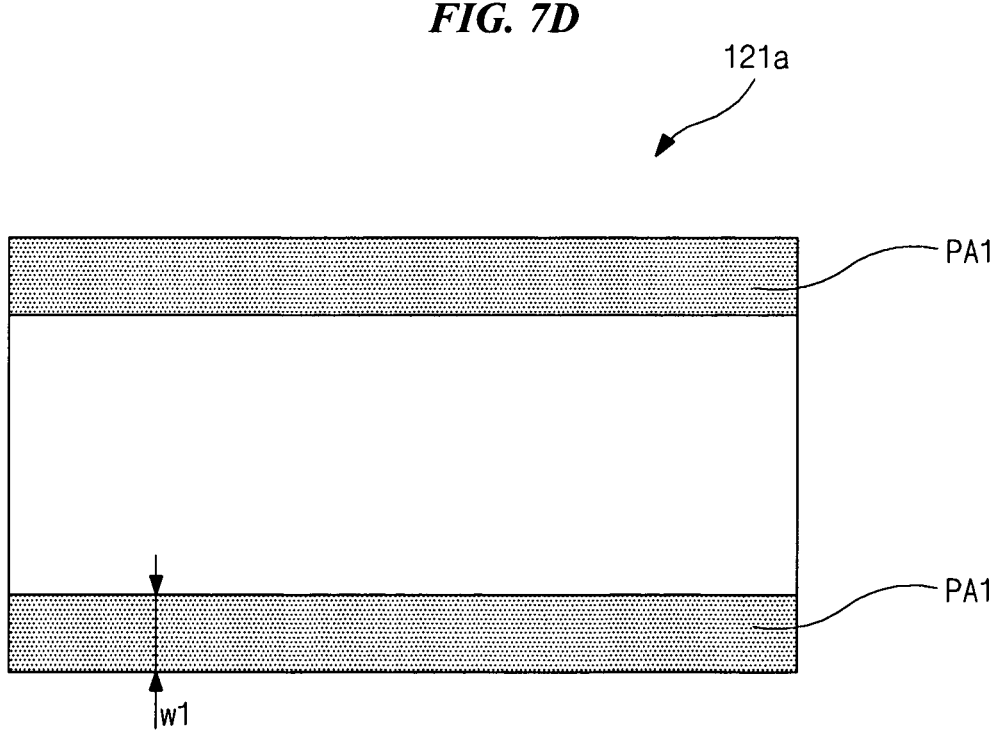

In FIG. 7A, the first printing pattern PA1 is formed on all edges of the first printing pattern 121a. Namely, the first printing pattern PA1 is formed at four sides of a rear surface of the first printing pattern 121a except a center portion. Alternatively, the printing pattern PA may be formed at one side, adjacent two sides or opposite two sides, as shown in FIGS. 7B to 7D. Although not shown, the printing pattern may be formed at three sides. A width w1 of the first printing pattern PA1 depends on a size of the LCDM. For example, the width w1 may have a range of about 0.5 to 2 centimeters. Each of the second and third printing patterns PA2 and PA3 may have the same width and position as the first printing pattern PA1.

The first printing pattern PA1 is formed by a printing method using black, gray or white ink. For example, a roller, where the ink is coated, is rotated along a rear surface of the lenticular sheet 121a such that the first printing pattern PA1 is transferred on the rear surface of the lenticular sheet 121a.

It is very difficult to form the first printing pattern PA1 on a prism sheet, where a prism lens is formed, by a printing method. There is damage on the prism lens by the roller during the printing process. In addition, when particles are inserted in a position between adjacent peaks of the prism lens, it is very difficult to remove the particles. To prevent the particles from inserting, the prism sheet is transported with protection films on front and rear surface of the prism sheet. Accordingly, the protection films are detached before the printing process and re-attached after the printing process. Unfortunately, the particles are inserted during the printing process. In addition, even if the printing pattern is formed without damages or particles, the printing pattern is damaged when the protection films are detached during after-processes. Accordingly, the printing pattern is formed on the lenticular sheet or the diffusion sheet. There is no damage on the lenticular lens LL on the lenticular sheet 121a, and the lenticular sheet 121a is transported without the protection films. Accordingly, it is easy to form the printing pattern PA on the lenticular sheet 121a.

As mentioned above, one prism sheet and one diffusion sheet in the related art LCDM is replaced with one lenticular sheet 121a of the LCDM according to the present invention such that the LCDM can produce images having an uniform brightness. In addition, a hot spot problem and a light leakage are efficiently prevented.

Figure 8A:
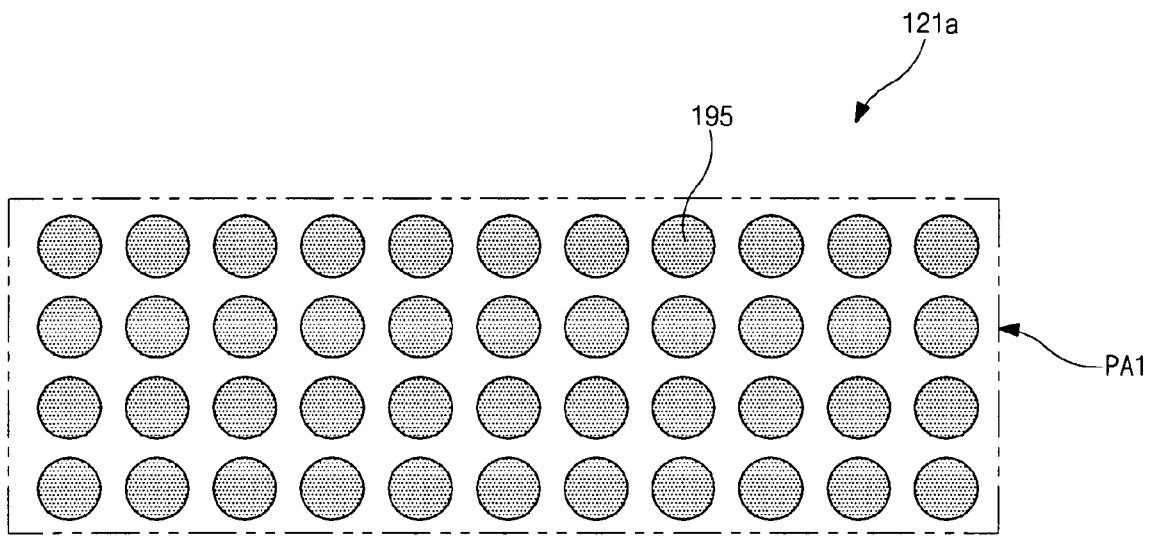
FIGS. 8A and 8B are respectively enlarged plan views illustrating a printed pattern on a lenticular sheet for a backlight unit according to the present invention.
Figure 8B:
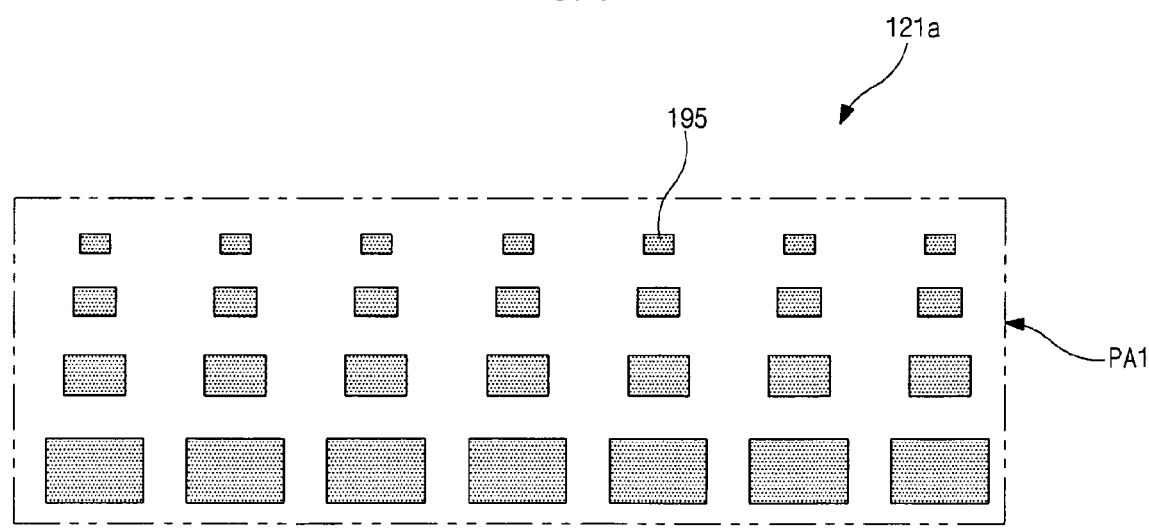

FIGS. 8A and 8B are respectively enlarged plan views illustrating a printed pattern on a lenticular sheet for a backlight unit according to the present invention.

In FIG. 8A, a plurality of sub-patterns 195 of the first printing pattern PA1 is formed on the lenticular sheet 121a. Each of the sub-patterns 195 has the same area and the same shape. Alternatively, as shown in FIG. 8B, each of the sub-patterns 195 has the same shape and different sizes. For example, the sub-pattern 195 has gradually varied size. The sub-pattern 195 may have a circular shape, an elliptic shape or a polygonal shape.

Figure 9:
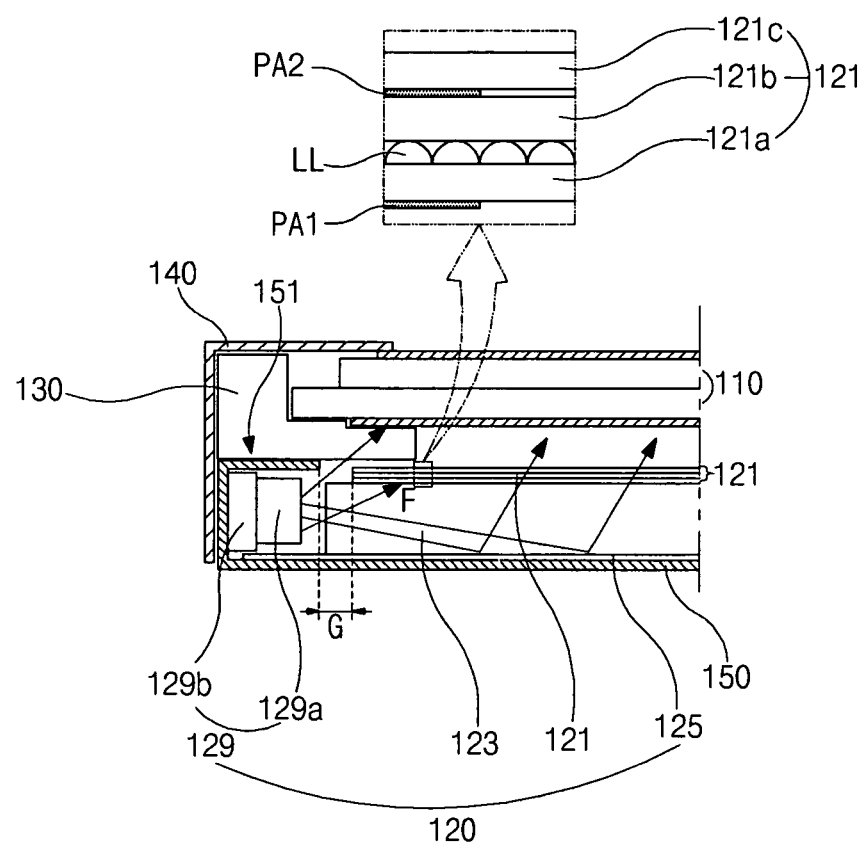
FIG. 9 is a cross-sectional view of an LCDM according to the present invention.

FIG. 9 is a cross-sectional view of an LCDM according to the present invention. In FIG. 9, an LED 29a is positioned at one side of the light guide plate 123 and arranged on the PCB 129b. The LED 129a has a fixed position and faces a side portion of the light guide plate 123 such that light emitted from the LED 129a is projected to the light guide plate 123. To provide a space for the LED assembly 129, the bottom frame 150 has a bending portion 51. Namely, the bottom frame 150 is bent upwardly and inwardly.

The light F emitted from the LED 129a is projected to the light guide plate 123 and refracted or reflected to be projected onto the liquid crystal panel 110. The light F is processed into an uniform plane light source during passing the optical sheet 121.

The optical sheet 121 for the backlight unit 120 according to the present invention includes sub-sheets less than the optical sheet for the related art backlight unit such that the LCDM has a thinner profile and a lighter weight. In addition, production costs for the LCDM are reduced. Since a first printing pattern PA1 is formed on back edges of a first lenticular sheet 121a, light through a gap G between the bending portion 151 of the bottom frame 150 and the light guide plate 123 is blocked such that a hot spot problem is prevented even if the optical sheet 121 includes two or three sheets. In addition, light reflected on a side wall of the main frame 130 can be blocked such that a white line problem on images is also prevented. Moreover, since the optical sheet 121 includes the first lenticular sheet 121a, where a lenticular lens LL is formed, a prism sheet 121b, where a prism lens PL (of FIG. 5A) is formed, on the first lenticular sheet 121a and a diffusion sheet 121c, an uniform light can be provided into the liquid crystal panel 110.

The liquid crystal display panel 110 and the backlight unit 120 are combined using the main frame 130 that can prevent movement of the liquid crystal panel 110 and the backlight unit 120. Namely, the main frame 130 surrounds sides of the backlight unit 120. The top frame 140 cover edges of the liquid crystal panel 110 and sides of the main frame 130, so the top frame 140 can support and protect of the edges of the liquid crystal panel 110 and sides of the main frame 130. The bottom frame 150 covers back edges of the main frame 130, so the bottom frame 150 is combined with the main frame 130 and the top frame 140 for modulation.

It will be apparent to those skilled in the art that various modifications and variations can be made in the exemplary embodiments of the backlight unit and the LCDM without departing from the spirit or scope of the invention. Thus, it is intended that the invention cover the modifications and variations of this invention provided they come within the scope of the appended claims and their equivalents.

What is claimed is:
1. A backlight unit for a display device, comprising:
a light guide plate;

a reflective sheet under the light guide plate;
a light source positioned on at least one side of the light guide plate and providing a light into the light guide plate; and
an optical sheet disposed on the light guide plate and including a first lenticular sheet, the first lenticular sheet including a base film having a center portion and an edge portion surrounding the center portion for diffusing the light through the light guide plate, a first lenticular lens disposed on a front surface of the base film and having a half-cylinder shape and a first printing pattern exclusively on at least one edge of a rear surface of the edge portion of the base film, the center portion of the base film being substantially free of the first printing pattern,
wherein the first printing pattern has a plurality of sub-patterns that are formed of an ink material, and
wherein the plurality of sub-patterns further include first to third sub-patterns, the third sub-pattern is positioned between the first and second sub-patterns, and the third sub-pattern has a size smaller than the first sub-pattern and greater than the second sub-pattern.

2. The backlight unit of claim 1, wherein the optical sheet further includes a prism sheet on the first lenticular sheet and including a prism lens thereon, wherein a direction of the prism lens is perpendicular to a direction of the first lenticular lens.

3. The backlight unit of claim 2, wherein the optical sheet further includes a diffusion sheet on the prism sheet and including a second printing pattern on at least one edge of a rear surface of the diffusion sheet, wherein the second printing pattern corresponds to the first printing pattern.

4. The backlight unit of claim 1, wherein the optical sheet further includes a second lenticular sheet on the first lenticular sheet and including a second lenticular lens thereon, wherein a direction of the second lenticular lens is perpendicular to a direction of the first lenticular lens and has the same half-cylinder shape as the first lenticular lens.

5. The backlight unit of claim 4, wherein the optical sheet further includes a diffusion sheet on the second lenticular sheet and including a second printing pattern on at least one edge of a rear surface of the second lenticular sheet, wherein the second printing pattern corresponding to the first printing pattern.

6. The backlight unit of claim 4, wherein the second lenticular sheet further includes a second printing pattern on at least one edge of a rear surface of the second lenticular sheet, wherein the second printing pattern corresponding to the first printing pattern.

7. The backlight unit of claim 1, wherein the base film includes a plurality of beads therein to diffuse the light.

8. The backlight unit of claim 1, wherein the base film includes a plurality of dot patterns on a center of the rear surface of the base film to diffuse the light.

9. The backlight unit of claim 1, wherein the first printing unit has a width with a range of about 0.5 to 2 centimeters.

10. The backlight unit of claim 1, wherein the first pattern has one of a circular shape, an elliptic shape and a polygonal shape.

11. The backlight unit of claim 1, wherein the first printing pattern is formed at opposite two edges.

12. A liquid crystal display module, comprising:
a liquid crystal panel;
a backlight unit for projecting light on the liquid crystal panel, the backlight unit including:
a light guide plate;
a reflective sheet under the light guide plate;
a light source positioned on at least one side of the light guide plate and providing a light into the light guide plate; and
an optical sheet disposed on the light guide plate and including a first lenticular sheet, the first lenticular sheet including a base film having a center portion and an edge portion surrounding the center portion for diffusing the light through the light guide plate, a first lenticular lens disposed on a front surface of the base film and having a half-cylinder shape and a first printing pattern exclusively on at least one edge of a rear surface of the edge portion of the base film, the center portion of the base film being substantially free of the first printing pattern;
a bottom frame under the backlight unit;
a main frame surrounding sides of the backlight unit; and
a top frame surrounding an edge of the liquid crystal panel and attached to the bottom frame and the main frame,
wherein the first printing pattern has a plurality of sub-patterns that are formed of an ink material, and
wherein the plurality of sub-patterns further include first to third sub-patterns, the third sub-pattern is positioned between the first and second sub-patterns, and the third sub-pattern has a size smaller than the first sub-pattern and greater than the second sub-pattern.

13. The liquid crystal display module of claim 12, wherein the optical sheet further includes a prism sheet on the first lenticular sheet and including a prism lens thereon, wherein a direction of the prism lens is perpendicular to a direction of the first lenticular lens.

14. The liquid crystal display module of claim 13, wherein the optical sheet further includes a diffusion sheet on the prism sheet and including a second printing pattern on at least one edge of a rear surface of the diffusion sheet, wherein the second printing pattern corresponds to the first printing pattern.

15. The liquid crystal display module of claim 12, wherein the optical sheet further includes a second lenticular sheet on the first lenticular sheet and including a second lenticular lens thereon, wherein a direction of the second lenticular lens is perpendicular to a direction of the first lenticular lens and has the same half-cylinder shape as the first lenticular lens.

16. The liquid crystal display module of claim 15, wherein the optical sheet further includes a diffusion sheet on the second lenticular sheet and including a second printing pattern on at least one edge of a rear surface of the second lenticular sheet, wherein the second printing pattern corresponding to the first printing pattern.

17. The liquid crystal display module of claim 15, wherein the second lenticular sheet further includes a second printing pattern on at least one edge of a rear surface of the second lenticular sheet, wherein the second printing pattern corresponding to the first printing pattern.

18. The liquid crystal display module of claim 12, wherein the base film includes a plurality of beads therein or a plurality of dot patterns on a center of a rear surface of the base film to diffuse the light.

19. The liquid crystal display module of claim 12, wherein the first printing unit has a width with a range of about 0.5 to 2 centimeters and has one of a circular shape, an elliptic shape and a polygonal shape.

20. The liquid crystal display module of claim 12, wherein the first printing pattern is formed at opposite two edges.

21. The backlight unit of claim 1, wherein the first printing pattern is formed of a black ink or a gray ink, and the black ink or the gray ink faces the light guide plate.

22. The liquid crystal display module of claim 12, wherein the first printing pattern is formed of a black ink or a gray ink, and the black ink or the gray ink faces the light guide plate.

* * * * *